(12) United States Patent
Sugimoto

(10) Patent No.: US 7,397,955 B2
(45) Date of Patent: Jul. 8, 2008

(54) DIGITAL CAMERA AND METHOD OF CONTROLLING SAME

(75) Inventor: Masahiko Sugimoto, Asaka (JP)

(73) Assignee: Fujifilm Corporation, Minato-ku, Tokyo (JP)

( * ) Notice: Subject to any disclaimer, the term of this patent is extended or adjusted under 35 U.S.C. 154(b) by 717 days.

(21) Appl. No.: 10/841,510

(22) Filed: May 10, 2004

(65) Prior Publication Data
US 2004/0233296 A1 Nov. 25, 2004

(30) Foreign Application Priority Data
May 20, 2003 (JP) .............................. 2003-141256

(51) Int. Cl.
G06K 9/62 (2006.01)
(52) U.S. Cl. .................. 382/209; 382/162; 382/167; 396/413; 396/411; 396/429
(58) Field of Classification Search .............. 382/103, 382/118, 173, 209, 217, 218, 162, 167; 396/413, 396/411, 429
See application file for complete search history.

(56) References Cited
U.S. PATENT DOCUMENTS
5,864,363 A * 1/1999 Giefing et al. .............. 348/143

6,885,761 B2 * 4/2005 Kage ......................... 382/118

FOREIGN PATENT DOCUMENTS

| JP | 8-63597 | 3/1996 |
|----|---------|--------|
| JP | 2001-330882 | 11/2001 |
| JP | 2003-107555 | 4/2003 |

* cited by examiner

Primary Examiner—Matthew C. Bella
Assistant Examiner—Mike Rahmjoo
(74) Attorney, Agent, or Firm—McGinn IP Law Group, PLLC

(57) ABSTRACT

Whether a portrait photography mode has been set is determined. A first threshold value is set when the portrait photography mode has been set and a second threshold value that is smaller than the first threshold value is set when the portrait photography mode has not been set. A cross-correlation coefficient between the image of the subject and a template image is calculated. The calculated coefficient and the set threshold value are compared and the position of the image of a face is detected in the image of the subject. When the portrait photography mode has been set, it can be construed that the subject contains a person and therefore the position of the face image can be detected comparatively accurately by increasing the threshold value.

9 Claims, 6 Drawing Sheets

DIGITAL CAMERA AND METHOD OF CONTROLLING SAME

BACKGROUND OF THE INVENTION

1. Field of the Invention

This invention relates to a digital camera (inclusive of a digital still camera, digital movie camera and a portable information device having a camera function) and to a method of controlling the operation thereof.

2. Description of the Related Art

In a case where a picture of a person is taken using a digital camera, often the camera is focused on the face of the person. Focusing is easy if the face is at the center of the shooting zone but the face is not always at the center of the shooting zone. There are occasions, therefore, when it is necessary to detect the image of the face in the image of the subject. For example, there is a technique that involves extracting the portion of the subject image that corresponds to the color of the face from the image, extracting the edge of this portion and then executing matching processing using a template (see the specification of Japanese Patent Application Laid-Open No. 8-63597).

A problem with this technique, however, is that the precision of the processing for extracting the image of the face is not always high.

Further, in some digital cameras it is possible to set a portrait photography mode. If a portrait photography mode has been set, there are occasions where processing specific to portrait photography, such as preliminary light emission, is executed in order to prevent red-eye at the time of flash photography. If the portrait photography mode has been set regardless of the fact that a person does not exist in the subject of photography, an unnatural image may be obtained.

Furthermore, in a digital camera that can be set to a scenery photography mode, it is wasteful to try and detect the image of a face if the scenery photography mode has been set.

SUMMARY OF THE INVENTION

Accordingly, an object of the present invention is to extract the image of a face with comparatively high precision.

Another object of the present invention is to enable the capture of a natural image.

A further object of the present invention is to eliminate needless processing.

According to a first aspect of the present invention, the foregoing objects are attained by providing a digital camera having an image sensing device for sensing the image of a subject and outputting image data that represents the image of the subject, a setting device for setting a portrait photography mode, and an image processing device for subjecting image data that is output from the image sensing device to image processing, which is suited to portrait photography, in accordance with setting of the portrait photography mode by the setting device, the camera comprising: a correlation value calculating device for calculating a correlation value between a template image of a face and an image within an area in part of the image of the subject represented by the image data output from the image sensing device; a determination device for determining whether the image in the area is the image of a face based upon whether or not the correlation value calculated by the correlation value calculation device is greater than a threshold value; and a control device for controlling the determination device in response to setting of the portrait photography mode by the setting device in such a manner that the threshold value used in the determination device is made higher in comparison with a case where the portrait photography mode has not been set.

The first aspect of the present invention provides also a method of controlling operation of the digital camera described above. Specifically, the present invention provides a method of controlling operation of a digital camera having an image sensing device for sensing the image of a subject and outputting image data that represents the image of the subject, a setting device for setting a portrait photography mode, and an image processing device for subjecting image data that is output from the image sensing device to image processing, which is suited to portrait photography, in accordance with setting of the portrait photography mode by the setting device, the method comprising the steps of: calculating a correlation value between a template image of a face and an image within an area in part of the image of the subject represented by the image data output from the image sensing device; in response to setting of the portrait photography mode, making a threshold value that is compared with the calculated correlation value higher in comparison with a case where the portrait photography mode has not been set; and determining whether the image in the area is the image of a face based upon whether or not the calculated correlation value is greater than the threshold value.

In accordance with the first aspect of the present invention, a correlation value is calculated between the template image of a face and an image within an area in part of the image of a subject represented by the image data output from the image sensing device. It is determined whether the image in the area is the image of a face based upon whether or not the calculated correlation value is greater than a threshold value. If the portrait photography mode has been set, often a person will be present in the subject of photography and therefore the threshold value used in determination processing is enlarged in comparison with the threshold value that prevails when the portrait photography mode has not been set.

Since the threshold value is raised when it is construed that a face is present in a subject, the image of the face can be detected in comparatively accurate (precise) fashion. Erroneous detection of the image of a face can be prevented.

According to a second aspect of the present invention, the foregoing objects are attained by providing a digital camera having an image sensing device for sensing the image of a subject and outputting image data that represents the image of the subject, a setting device for setting a portrait photography mode, and an image processing device for subjecting image data that is output from the image sensing device to image processing, which is suited to portrait photography, in accordance with setting of the portrait photography mode by the setting device, the camera comprising: a correlation value calculating device for calculating a correlation value between a template image of a face and an image within an area in part of the image of the subject represented by the image data output from the image sensing device; a determination device for determining whether an image of a face is contained in the image of the subject based upon whether or not the calculated correlation value by the correlation value calculation device is greater than a threshold value; and an alarm device for issuing an alarm, in response to a determination by the determination device that the image of a face is not contained in the image of the subject, in a case where the portrait photography mode has been set by the setting device.

The second aspect of the present invention provides also a method of controlling operation of the digital camera described above. Specifically, the present invention provides a method of controlling operation of a digital camera having an image sensing device for sensing the image of a subject and outputting image data that represents the image of the subject, a setting device for setting a portrait photography mode, and an image processing device for subjecting image data that is output from the image sensing device to image processing, which is suited to portrait photography, in accordance with setting of the portrait photography mode by the setting device, the method comprising the steps of: calculating a correlation value between a template image of a face and an image within an area in part of the image of the subject represented by the image data output from the image sensing device; determining whether an image of a face is contained in the image of the subject based upon whether or not the calculated correlation value is greater than a threshold value; and issuing an alarm, in response to a determination that the image of a face is not contained in the image of the subject, in a case where the portrait photography mode has been set.

In accordance with the second aspect of the present invention, it is determined whether the image of a face is contained in the image of a subject obtained by the sensing of an image. If the portrait photography mode has been set, an alarm is issued when the image of a face is not present.

If the portrait photography mode is set, image processing suited to portrait photography is executed. If image processing suited to portrait photography is executed in the event that a person is not present in the image of a subject, an unnatural image will be obtained. If the portrait photography mode has been set, therefore, an alarm is issued when the image of a face is not contained in the image of the subject, i.e., when the subject of photography does not include a person. When it is confirmed that the subject does not include a person, the portrait photography mode would be cancelled. A natural image will be obtained.

According to a third aspect of the present invention, the foregoing objects are attained by providing a digital camera having an image sensing device for sensing the image of a subject and outputting image data that represents the image of the subject, a setting device for setting a portrait photography mode, and an image processing device for subjecting image data that is output from the image sensing device to image processing, which is suited to portrait photography, in accordance with setting of the portrait photography mode by the setting device, the camera comprising: a determination device for determining whether an image of a face is contained in an image within an area in part of the image of the subject represented by the image data output from the image sensing device; and a control device for halting determination processing in the determination device in response to the portrait photography mode not being set by the setting device.

The third aspect of the present invention provides also a method of controlling operation of the digital camera described above. Specifically, the present invention provides a method of controlling operation of a digital camera having an image sensing device for sensing the image of a subject and outputting image data that represents the image of the subject, a setting device for setting a portrait photography mode, and an image processing device for subjecting image data that is output from the image sensing device to image processing, which is suited to portrait photography, in accordance with setting of the portrait photography mode by the setting device, the method comprising the steps of: determining whether an image of a face is contained in an image within an area in part of the image of the subject represented by the image data output from the image sensing device; and halting determination processing in response to the portrait photography mode not being set.

In accordance with the third aspect of the present invention, processing for determining whether the image of a face is contained in the image of a subject is halted if the portrait photography mode has not been set (e.g., if a night-scene mode or scenery mode, etc., has been set). If the portrait photography mode has not been set, then the subject of photography often will not include a person. In other words, often the image of a face will not be contained in the image of the subject obtained by image sensing. It is meaningless, therefore, to execute processing for detecting the image of a face from the image of the subject. According to the third aspect of the invention, determination processing for detecting the image of a face is not carried out if the portrait photography mode has not been set. This makes it possible to prevent wasted processing.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail with reference to the drawings.

Figure 1:
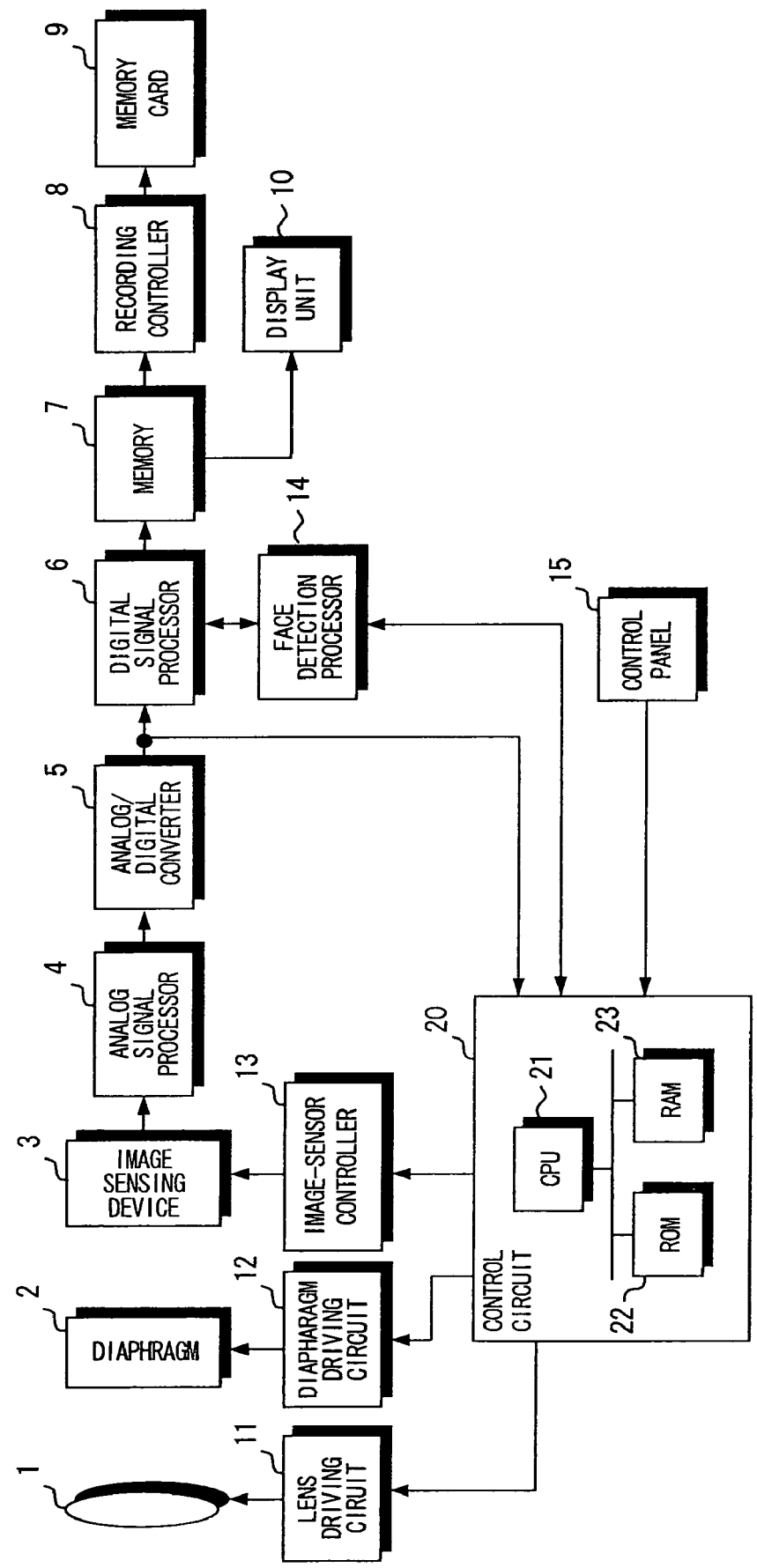
FIG. 1 is a block diagram illustrating the electrical structure of a digital still camera according to the present invention.

FIG. 1 is a block diagram illustrating the electrical structure of a digital still camera according to a preferred embodiment of the present invention.

In the digital still camera according to this embodiment, the area of the image of a face contained in the image of a subject obtained by imaging is detected using a template image. Exposure is adjusted in such a manner that the image of the face in the detected area will be illuminated appropriately.

The overall operation of the digital still camera is controlled by a control circuit 20.

The control circuit 20 includes a CPU 21, a ROM 22 and a RAM 23 interconnected by a bus. Image data representing a template image has been stored in the ROM 22. The RAM 23 stores image data utilized in face detection as well as other image data.

The digital still camera includes a control panel 15 that includes a two-stroke shutter-release button and a mode setting dial, etc. Modes settable by the mode setting dial include image sensing modes and a playback mode. The image sensing modes are a portrait photography mode, scenery photography mode and a night-scene photography mode. The setting of the portrait photography mode, scenery photography mode or night-scene photography mode is performed by displaying each of the modes on a display screen and selecting any of these modes. It is of course possible to adopt an arrangement in which the portrait photography mode, scenery photography mode and night-scene photography mode can be set using a dial or the like. A control signal output from the control panel 15 is input to the control circuit 20.

The zoom position of a zoom lens 1 is controlled by a lens driving circuit 11. The aperture of a diaphragm 2 is controlled by a diaphragm driving circuit 12. Light rays representing the image of the subject are condensed by the zoom lens 1 and impinge upon an image sensing device 3 such as a CCD through the diaphragm 2.

The image sensing device 3 is controlled by an image-sensor control circuit 13 and a video signal representing the image of the subject is output from the image sensing device 3. The video signal is subjected to analog signal processing such as correlated double sampling by an analog signal processing circuit 4. The video signal that is output from the analog signal processing circuit 4 is converted to digital image data in an analog/digital conversion circuit 5 and the digital image data is input to the control circuit 20 and a digital signal processing circuit 6. The latter executes digital signal processing such as a gamma correction and white balance adjustment.

If the portrait photography mode has been set, the digital signal processing circuit 6 executes processing such as color adjustment processing suited to portrait photography so as to render an attractive skin color for the image of the subject obtained by image capture. In this embodiment, an alarm is issued when the image of the subject does not contain the image of a face in a case where the portrait photography mode has been set. The alarm notifies the user that the portrait photography mode has been set mistakenly and allows the user to cancel the portrait photography mode. As a result, if the image of a person is not present in the image of the subject, it is possible to avoid a situation in which an unnatural image is produced by executing processing such as color adjustment processing suited to portrait photography.

The image data that is output from the digital signal processing circuit 6 is applied to a display unit 10 via a memory 7. The image of the subject is displayed on the display screen of the display unit 10.

If the shutter-release button is pressed through the first step of its stroke, the image data output from the digital signal processing circuit 6 is also input to a face detection processing circuit 14. The latter detects the area of a face image in the image of the subject represented by the entered image data. The signal representing this area in the image of the subject is applied to the control circuit 20. The diaphragm driving circuit 12 is controlled by the control circuit 20 so as to obtain the appropriate brightness in the area of the face image contained in the image of the subject represented by the image data provided by the analog/digital conversion circuit 5.

If the shutter-release button is pressed through the second step of its stroke, the subject is imaged again and image data representing the image of the subject is obtained in a manner similar to that described above. The image data is applied from the digital signal processing circuit 6 to the memory 7, where the data is stored temporarily. The image data is read out of the memory 7 and recorded on a memory card 9 by a recording control circuit 8. It goes without saying that data compression is carried out as necessary.

If the portrait photography mode has been set, it can be assumed that a person is included in the subject. In this embodiment, therefore, as will be described later, if the portrait photography mode has been set, a threshold value used in detecting the image of a face is set to be higher than that in a case where the portrait photography mode has not been set. This makes it possible to prevent erroneous detection of the image of a face and to detect the image of a face comparatively accurately.

Furthermore, this embodiment is such that if a mode other than the portrait photography mode, namely the scenery photography mode or night-scene photography mode, has been set, then processing for detecting the image of a face is halted. If the scenery photography mode or night-scene photography mode has been set, it is construed that a person is not present in the subject. Processing for detecting the image of face, therefore, is halted. This makes it possible to eliminate needless processing.

Figure 2:
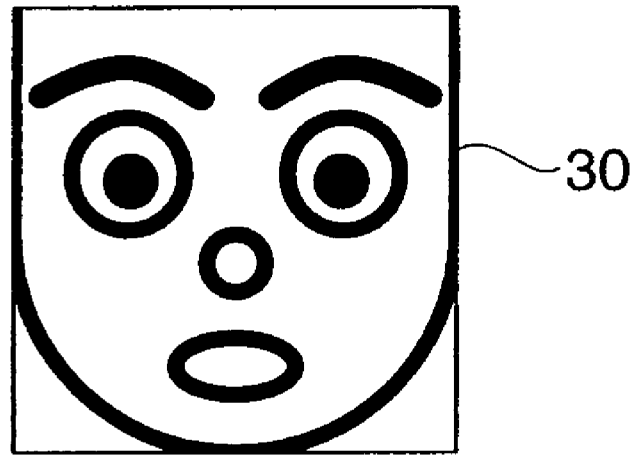
FIG. 2 illustrates an example of a template image.

FIG. 2 illustrates an example of a template image.

A template image 30 is for detecting a correlation value with respect to the image of a subject in which the image of a face is to be detected. While the image of the subject is being scanned, correlation values between positions on the template image 30 and positions in the image of the subject are detected. A detected correlation value is compared with a threshold value. The position of a search window 36 prevailing when the correlation value is greater than the threshold value is judged to be the position of the image of a face in the image of the subject.

Figure 3:
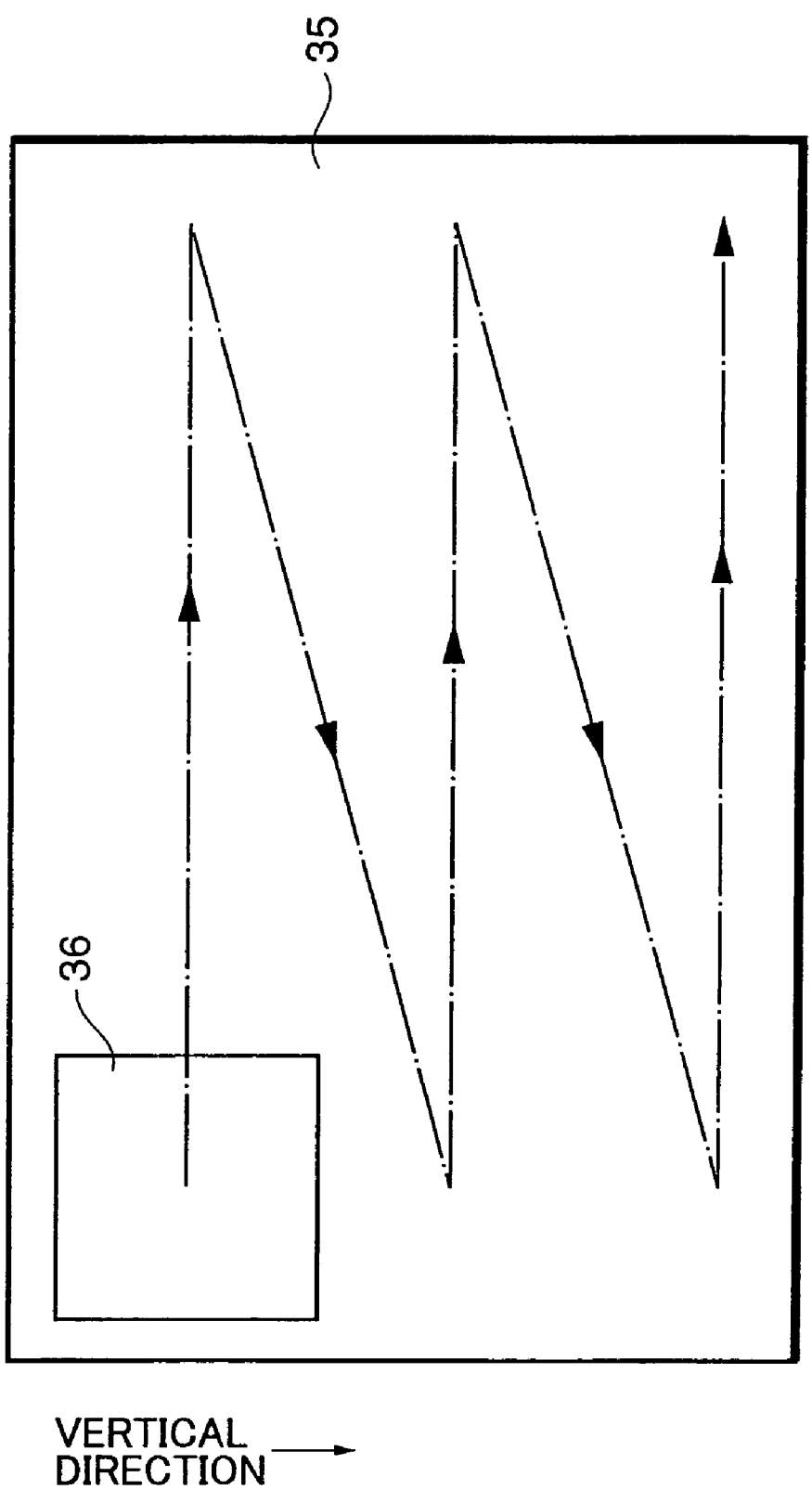
FIG. 3 is a diagram illustrating the relationship between the image of a subject and a search window.

FIG. 3 illustrates the relationship between the image of a subject in which the image of a face is detected and a search window.

If an image 35 of a subject in which the image of a face is to be detected is obtained, the search window 36 is defined. The search window 36 is rectangular in shape and the size thereof is the same as that of the template image 30.

A normalization cross-correlation coefficient r between the image in the search window 36 and the template image 30 is calculated using Equation (1) below and the value of this coefficient is compared with the threshold value. As mentioned above, the position of the search window 36 prevailing when the coefficient value is greater than the threshold value is judged to be the position of the image of a face in the image of the subject.

$$r = \{<T \cdot I> - <T> \cdot <I>\}/(\sigma(t) \cdot \sigma(I))$$ Eq. (1)

where T represents the template image 30, I the image in the search window 36, < > the average of the enclosed value, and σ a standard deviation.

The search window 36 is moved incrementally over small distances horizontally and vertically within the image 35 of the subject and the normalization cross-correlation coefficient is calculated again at the position to which the search window 36 has been moved. Movement of the search window 36 is repeated and processing for calculating the normalization cross-correlation coefficient at the position to which the search window 36 has been moved is executed. The portion of the image of the face in the image of the subject is detected based upon the obtained normalization cross-correlation coefficient.

Figure 4:
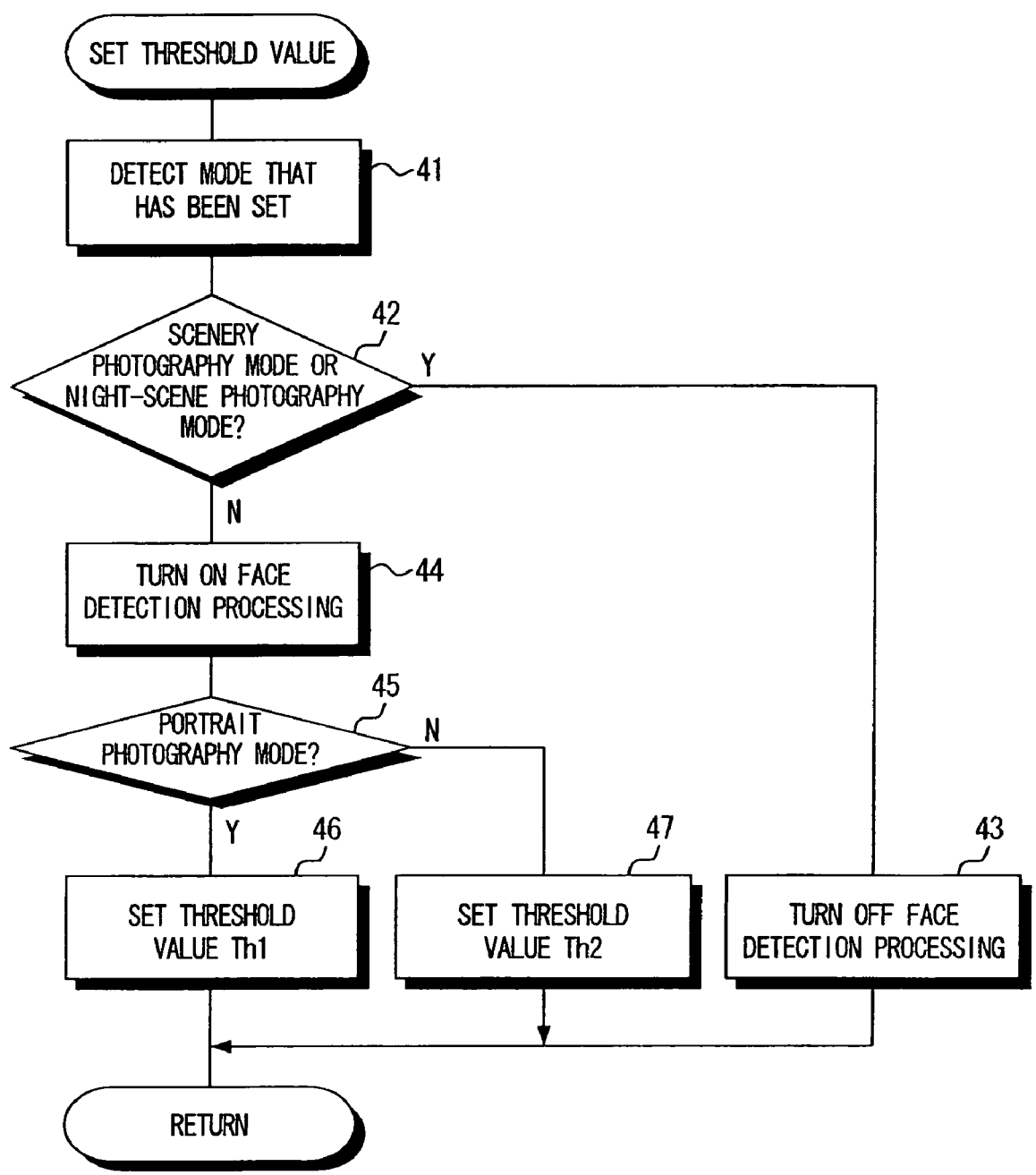
FIG. 4 is a flowchart illustrating processing for setting a threshold value according to the present invention.

FIG. 4 is a flowchart illustrating processing for setting the threshold value.

Processing for setting the threshold value is executed when processing for detecting the image of a face is carried out. Of course, an arrangement in which threshold-value setting processing is executed in conformity with the mode setting may be adopted.

In processing for setting the threshold value, first the photography mode that has been set is detected (step 41).

If the scenery photography mode or night-scene photography mode has been set ("YES" at step 42), it is construed that the subject includes a person, as mentioned above, and therefore face detection processing is turned off so that processing for detecting a face image will not be executed (step 43).

If neither the scenery photography mode nor the night-scene photography mode has been set ("NO" at step 42), then face detection processing is turned on (step 44).

If the portrait photography mode has been set ("YES" at step 45), then the threshold value used in detection of the face image is set to a first threshold value Th1 (step 46). If the portrait photography mode has not been set ("NO" at step 45), then the threshold value is set to a second threshold value Th2 that is smaller than the first threshold value Th1 (step 47).

The reason why the threshold value (first threshold value Th1) for the case where the portrait photography mode has been set is made larger than the threshold value (second threshold value Th2) for the case where the portrait photography mode has not been set is to detect the position of a face image more accurately because it is construed that the subject includes a person.

If the face detection processing is turned on, then processing for detecting the face image (search processing) is executed using the threshold value that has been set.

Figure 5:
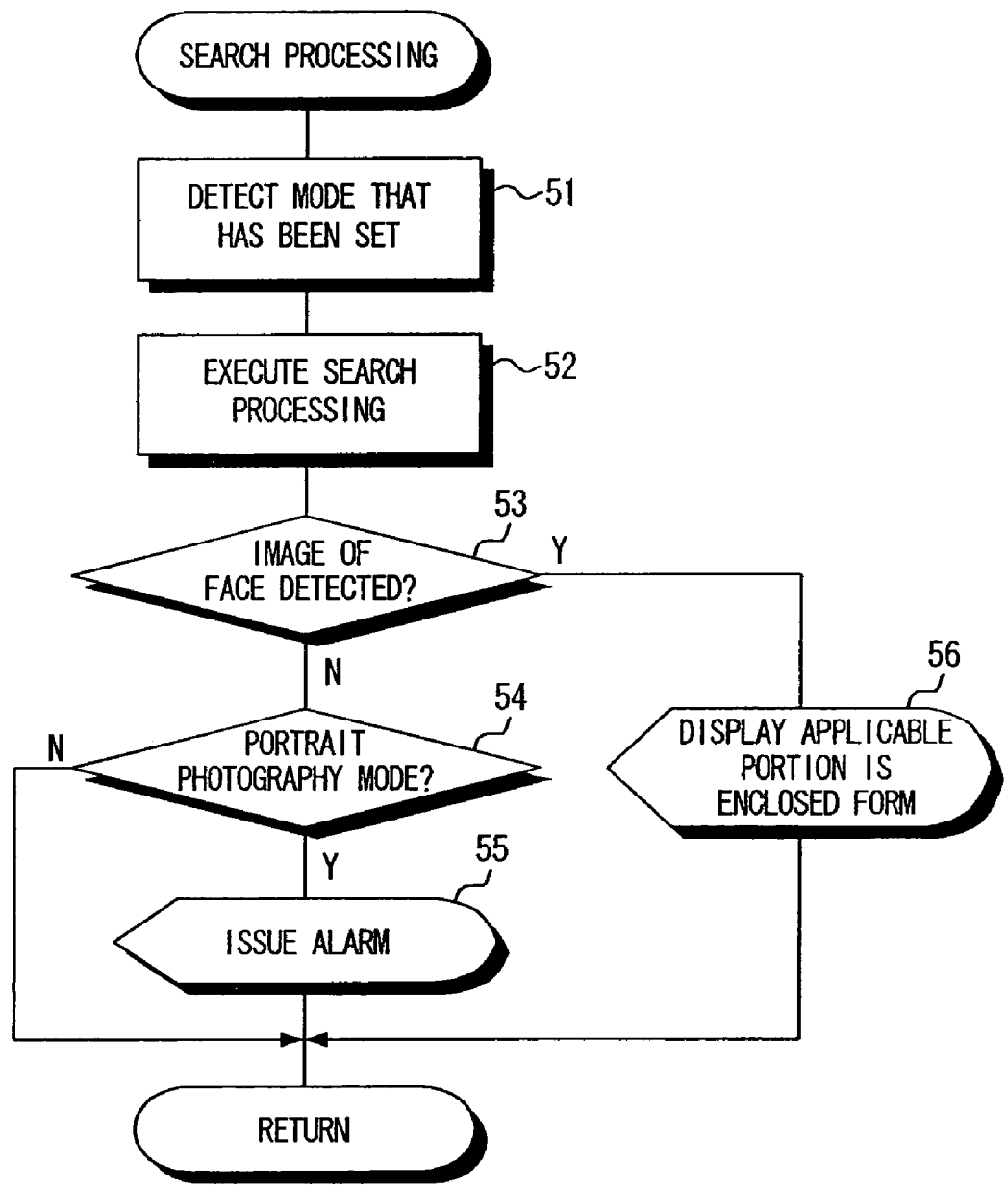
FIG. 5 is a flowchart illustrating search processing according to the present invention.

FIG. 5 is a flowchart illustrating search processing.

Search processing is executed in response to sensing of the image of the subject, as mentioned above.

The photography mode that has been set is detected in a manner similar to that when the above-mentioned threshold-value setting processing is executed (step 51).

Next, the search window 36 is scanned on the image of the subject and search processing is executed (step 52). This search processing is executed as follows: First, the normalization cross-correlation coefficient between the template image 30 and the image in the search window 36 is calculated. The calculated normalization cross-correlation coefficient and the threshold value (the first threshold value Th1 or the second threshold value Th2) that has been set in threshold-value setting processing are compared. The position of the search window 36 prevailing when a cross-correlation coefficient greater than the threshold value is obtained is a position where the image of a face is present in the image of the subject.

If the image of a face is not detected in the image of the subject by search processing ("NO" at step 53), then it is determined whether the portrait photography mode has been set (step 54). If the portrait photography mode has been set ("YES" at step 54), then an alarm is issued (step 55). The reason for this is to prevent a situation in which processing suited to the image of a person is executed regardless of the fact that the image of a person is not present in the image of the subject. The user would respond to the alarm by changing the portrait photography mode to another photography mode, e.g., by setting the scenery photography mode.

Figure 6:
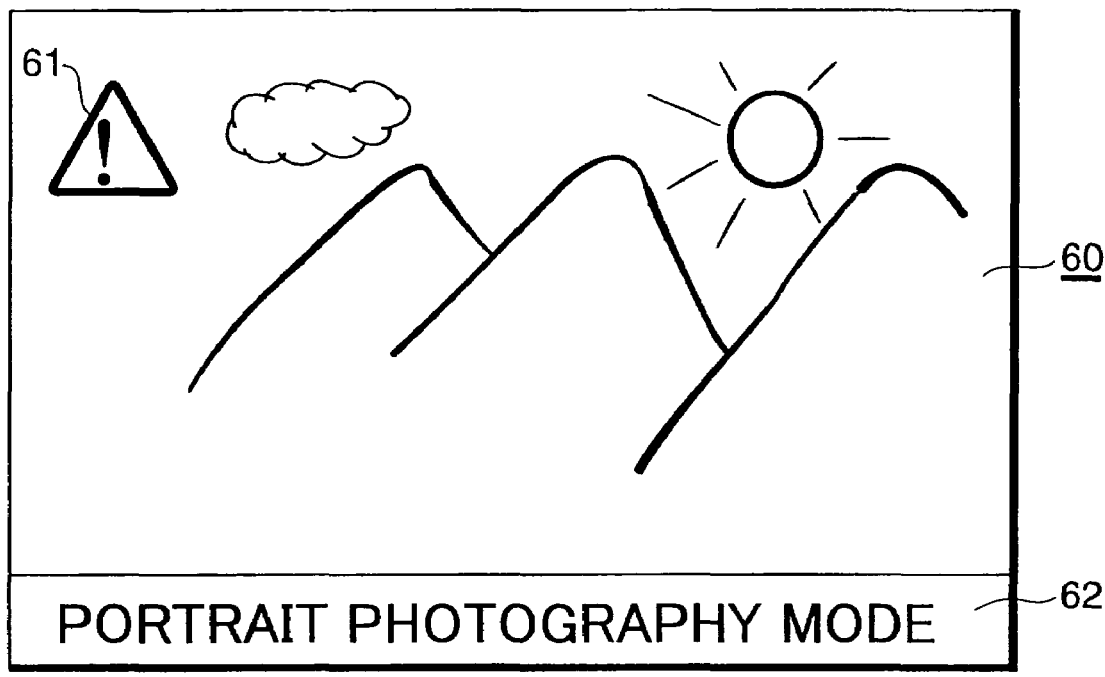
FIG. 6 is a diagram illustrating an example of the image of a subject displayed on a display screen.

FIG. 6 illustrates an example of an image in a case where the image of a subject is devoid of the image of a face in the portrait photography mode.

The image of the subject is being displayed on substantially the entirety of a display screen 60 of the display unit 10. An alarm mark 61 is displayed at the upper left of the display screen 60, and text 62 for notifying the user of the fact that the portrait photography mode has been set is displayed at the bottom of the display screen 60. By observing the alarm mark 61 or text 62, the user can ascertain that the portrait photography mode has been set despite the fact that the image of the subject does not include a person. Another photography mode can be set as necessary, as mentioned above.

With reference again to FIG. 5, the processing of step 55 is skipped if the portrait photography mode has not been set ("NO" at step 54).

If the result of executing the search processing is that the image of a face is found in the image of the subject ("YES" at step 53), then the applicable portion indicating the position of the face detected in the image of the subject is enclosed (step 56).

Figure 7:
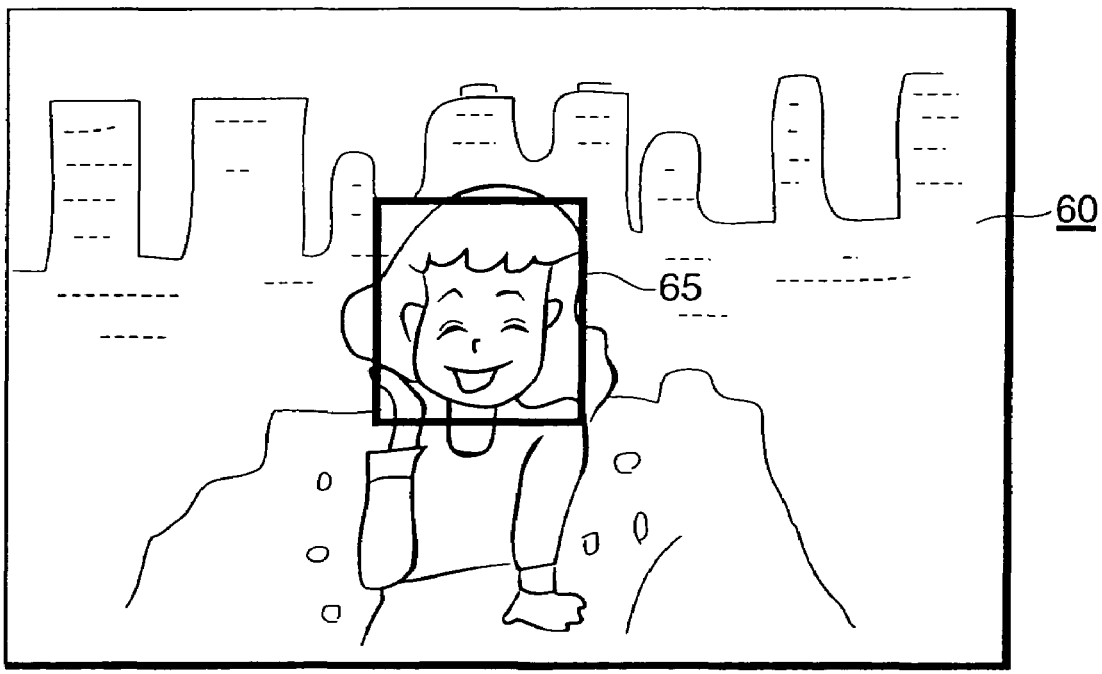
FIG. 7 is a diagram illustrating an example of the image of a subject displayed on the display screen.

FIG. 7 illustrates an example of an image in a case where the image of the subject includes the image of a face.

The image of the subject is being displayed over the entirety of the display screen 60.

The portion of the image of the subject in which the face has been found is displayed within a rectangular mark 65. The user can thus recognize the portion that is the image of the face. Exposure can also be controlled so as to obtain the appropriate brightness within the rectangular mark 65. In addition, focusing can also be controlled so as to achieve focusing with the rectangular mark 65. It goes without saying that the rectangular mark 65 need not necessarily be displayed.

As many apparently widely different embodiments of the present invention can be made without departing from the spirit and scope thereof, it is to be understood that the invention is not limited to the specific embodiments thereof except as defined in the appended claims.

What is claimed is:

1. A digital camera having an image sensing device for sensing an image of a subject and outputting image data that represents the image of the subject, a setting device for setting a portrait photography mode, a scenery photography mode, or a night-scene photography mode, and an image processing device for subjecting image data that is output from the image sensing device to image processing, which is suited to portrait photography, in accordance with setting of the portrait photography mode by the setting device, the camera comprising:

a correlation value calculating device for calculating a correlation value between a template image of a face and an image within an area in a part of the image of the subject represented by the image data output from the image sensing device;

a determination device for determining whether the image in said area comprises the image of a face based upon whether the correlation value calculated by said correlation value calculating device is greater than a threshold value; and a control device for controlling said determination device in response to setting of the portrait photography mode by said setting device in such a manner that the threshold value used in said determination device is made to be higher for said portrait photography mode, in comparison with a case where the scenery photography mode or the night-scene photography mode has been set by said setting device.

2. The digital camera of claim 1, wherein the correlation value comprises a normalization cross-correlation coefficient.

3. The digital camera of claim 1, wherein the control device halts the determination device from detecting whether the image in said area comprises an image of a face if the setting device sets a photography mode other than the portrait photography mode.

4. The digital camera of claim 1, wherein said image processing device generates a search window for selecting the area in part of the image of the subject.

5. A method of controlling a digital camera having an image sensing device for sensing an image of a subject and outputting image data that represents the image of the subject, a setting device for setting a portrait photography mode, a scenery photography mode, or a night-scene photography mode, and an image processing device for subjecting image data that is output from the image sensing device to image processing, which is suited to portrait photography, in accordance with setting of the portrait photography mode by the setting device, the method comprising:

calculating a correlation value between a template image of a face and an image within an area in a part of the image of the subject represented by the image data output from the image sensing device;

in response to setting of the portrait photography mode, making a threshold value that is compared with the calculated correlation value to be higher for said photography mode, in comparison with a case where the scenery photography mode or the night-scene photography mode has been set by said setting device; and determining whether the image in said area comprises the image of a face based upon whether the calculated correlation value is greater than the threshold value.

6. The method of claim 5, further comprising:

setting the image in said area as an image of a face if the calculated correlation value is higher than the threshold value.

7. The method of claim 6, further comprising:

determining a position of the image in said area if the calculated correlation value is greater than the threshold value.

8. The method of claim 5, further comprising:

calculating the correlation value again between the template image of the face and another image within another area in part of the image of the subject;

in response to the setting of the portrait photography mode, issuing an alarm if all of the calculated correlation values are smaller than the threshold value.

9. The method of claim 5, further comprising:

moving a search window comprising an area in part of the image of the subject;

calculating a correlation value again at a position to which the search window has moved;

determining again whether the image in said area comprises an image of a face; and repeating movement of the search window.

* * * * *